(12) United States Patent
Aartsen et al.

(10) Patent No.: US 12,465,303 B2
(45) Date of Patent: Nov. 11, 2025

(54) X-RAY DETECTOR WITH ADAPTIVE RESOLUTION

(71) Applicant: Teledyne Adimec Advanced Image Systems B.V., Eindhoven (NL)

(72) Inventors: Reinder Gerrit Aartsen, Veldhoven (NL); René Weltje, Eindhoven (NL)

(73) Assignee: Teledyne Adimec Advanced Image Systems B.V., Eindhoven (NL)

( * ) Notice: Subject to any disclaimer, the term of this patent is extended or adjusted under 35 U.S.C. 154(b) by 156 days.

(21) Appl. No.: 18/249,064

(22) PCT Filed: Oct. 21, 2021

(86) PCT No.: PCT/EP2021/079219
§ 371 (c)(1),
(2) Date: Apr. 14, 2023

(87) PCT Pub. No.: WO2022/084451
PCT Pub. Date: Apr. 28, 2022

(65) Prior Publication Data
US 2023/0397896 A1    Dec. 14, 2023

(30) Foreign Application Priority Data
Oct. 21, 2020    (NL) ...................... 2026719

(51) Int. Cl.
*A61B 6/42*    (2024.01)
*A61B 6/00*    (2006.01)
*A61B 6/46*    (2024.01)

(52) U.S. Cl.
CPC .......... *A61B 6/4233* (2013.01); *A61B 6/4441* (2013.01); *A61B 6/469* (2013.01); *A61B 6/54* (2013.01); *A61B 6/563* (2013.01)

(58) Field of Classification Search
CPC ..... A61B 6/4233; A61B 6/4441; A61B 6/469; A61B 6/54; A61B 6/563
See application file for complete search history.

(56) References Cited

U.S. PATENT DOCUMENTS

| | | | |
|---|---|---|---|
| 7,529,427 B2 | 5/2009 | Schweng | |
| 11,684,431 B2 * | 6/2023 | Crawford | ............... A61B 34/70 600/424 |

(Continued)

FOREIGN PATENT DOCUMENTS

| | | |
|---|---|---|
| CN | 104764757 A | 7/2015 |
| CN | 106290417 A | 1/2017 |

(Continued)

OTHER PUBLICATIONS

Toshiba brochure 'FDX4343R X-ray Flat Panel Detector (FPD)'.

(Continued)

*Primary Examiner* — David J Makiya
*Assistant Examiner* — Fani Polyzos Boosalis
(74) *Attorney, Agent, or Firm* — Ipsilon USA—NLO

(57) ABSTRACT

An X-ray detector comprises a detector panel (100) comprising a surface with a plurality of detector pixels, wherein the detector pixels are configured to convert received X-rays into electric signals representative of values indicative of the received X-rays. A data interface (308) transmits images having a fixed number of output pixels. A control unit controls to set (401) a region of interest comprising at least a subset of the plurality of detector pixels, wherein a number of detector pixels in the region of interest is independent of the number of output pixels. The control unit maps (403) the region of interest onto an output image having the fixed number of output pixels. The control unit resamples (404) the detector pixels within the region of interest to obtain (Continued)

values for the output pixels of the output image, and transmits (405) the output image via the data interface.

14 Claims, 4 Drawing Sheets

(56) References Cited

U.S. PATENT DOCUMENTS

| | | |
|---|---|---|
| 2003/0118153 A1 | 6/2003 | Suzuki |
| 2003/0213914 A1 | 11/2003 | Kobayashi et al. |
| 2004/0179643 A1 | 9/2004 | Gregerson et al. |
| 2004/0208279 A1 | 10/2004 | Xiao et al. |
| 2007/0071160 A1 | 3/2007 | Nishide et al. |
| 2007/0172104 A1 | 7/2007 | Nishide et al. |
| 2008/0285711 A1 | 11/2008 | Avinash et al. |
| 2011/0096894 A1 | 4/2011 | Uehara et al. |
| 2013/0051519 A1 | 2/2013 | Yang et al. |
| 2013/0129049 A1 | 5/2013 | Ishii |
| 2014/0064458 A1 | 3/2014 | Jobst et al. |
| 2015/0146847 A1 | 5/2015 | Liu |
| 2018/0325485 A1 | 11/2018 | Maslowski et al. |
| 2019/0058001 A1 | 2/2019 | Tian |

FOREIGN PATENT DOCUMENTS

| | | |
|---|---|---|
| CN | 205982138 U | 2/2017 |
| JP | 2004230164 A | 8/2004 |
| JP | 2007054527 A | 3/2007 |
| JP | 2009172078 A | 8/2009 |

OTHER PUBLICATIONS

"Dosimeters and Safety Devices for Ionizingradiation", https://ritmindustry.com/catalog/dosimeters-and-safety-devices-for-ionizing radiation/x-ray-detector-digital-cmos-high-performance/.

* cited by examiner

X-RAY DETECTOR WITH ADAPTIVE RESOLUTION

FIELD OF THE INVENTION

The invention relates to an X-ray imaging system. More particularly, the invention relates to an X-ray detector. The invention further relates to a method of an X-ray detector.

BACKGROUND OF THE INVENTION

Although flat panel X-ray detectors have been introduced some time ago, X-ray detectors comprising an image intensifier and a camera are still in wide use, thanks to their flexibility and cost effectiveness, in particular in dynamic imaging applications, such as cardiology and surgery.

Flat panel X-ray detectors that are presently on the market are predominantly based on either amorf silicium (a-Si) or complementary metal-oxide-semiconductor (CMOS) technology. The former has the disadvantage of being susceptive to noise, whereas the latter is too expensive for many markets. Recent advances in flat panel technologies provide improvements in other types of detectors, for example based on indium gallium zinc oxide (IGZO) technology. Flat panel X-ray detectors have certain advantages over image intensifier based systems, thanks to their sensitivity and distortion free images.

SUMMARY OF THE INVENTION

There is a need for a more satisfying X-ray detector that is both cost effective and/or provides sufficient image quality. In order to address this concern, an X-ray imaging system is provided comprising an X-ray detector. The X-ray detector comprises:
- a detector panel comprising a surface with a plurality of detector pixels, wherein the detector pixels are configured to receive X-rays, and convert received X-rays into electric signals representative of values indicative of the received X-rays;
- a data interface configured to transmit images having a fixed number of output pixels; and
- a control unit configured to control to:
  set a region of interest comprising at least a subset of the plurality of detector pixels, wherein a number of detector pixels in the region of interest is independent of the number of output pixels,
  map the region of interest onto an output image having the fixed number of output pixels,
  resample the detector pixels within the region of interest to obtain values for the output pixels of the output image, and
  transmit the output image via the data interface.

This may make advanced technological developments in flat panel X-ray detector technology more widely available, because it allows to replace an existing detector with any other type of detector, which may have a different image resolution. Further, it is more cost effective to be able include the latest detector in new systems, without having to redesign the whole system, in particular for images of a different resolution. Indeed, a lot of development effort is put in optimizing the processing, display, and storage of images that may be generated by the detector. Being able to replace the X-ray detector by another type of detector, with a minimal amount of further design changes, is a highly welcome improvement.

The X-ray detector may further comprise an input unit configured to receive a signal indicative of the region of interest, wherein a size of the region of interest is substantially continuously variable. This way, the system allows for substantially continuous zoom, which provides flexibility without requiring to increase the capacity of a communications channel through which the images are transmitted, for example. When the region of interest becomes smaller, smaller details become visible in the output image since the output image has fixed resolution. When the region of interest becomes larger, sensitivity of each output pixel is increased by combining the information of several detector pixels using a resampling technique. This way, all the X-ray dose is used to improve image quality.

For example, the input unit is configured to receive a zoom factor. For example, the region of interest may be in the center of the detector panel, the size of the region of interest being determined by the zoom factor. Moreover, the technique enables different zoom factors—corresponding to differently sized regions of interest—to be employed while maintaining a suitable image detail at all times.

The resolution of the output image may be fixed by design. For example, the number of pixels in the output image may be fixed by design. Fixed by design meaning that the resolution is set by the designer of the system, for example to match the image processing pipeline of the imaging system, at the time of manufacturing or installation, and not by a user interface selectable by an end user.

For example, the number of pixels in the output image matches a processing capability of a host system for the X-ray detector. This way, the host system can be used with the X-ray detector, regardless of the number of detector pixels on the X-ray detector.

The X-ray detector may further comprise a connection means for physically mounting the X-ray detector on an apparatus having a corresponding connection means, wherein the data interface is configured to transmit the output images to the apparatus. This way the X-ray detector becomes part of the apparatus. The resampling by the control unit ensures that the number of detector pixels causes no problem for the apparatus, since number of output pixels does not depend on the number of detector pixels. For example, the data interface may be configured to transmit the output images to the apparatus through the connection means, e.g. by means of a wired connection.

The output image has a number of output pixels in a first direction and a number of output pixels in a second direction, and any multiple of the number of output pixels in the first direction may be different from the number of detector pixels in the first direction in the region of interest and/or any multiple of the number of output pixels in the second direction may be different from the number of detector pixels in the region of interest in the second direction. This provides flexibility. The number of detector pixels poses no problem for the host system. This further emphasizes that the resolution of the detector may be different from the resolution of the output image in both directions and does not have to be a multiple.

The X-ray detector may be configured to detect a series of X-ray images, and the control unit may be configured to resample the pixels within the region of interest in real time and the transceiver may be configured to transmit the output images corresponding to the detected X-ray images in real time. The detector can be used, for example, in a fluoroscopy mode, which allows the moving image to be detected. The detector can supply the resulting output images in real time, to allow processing and visualization of the image series directly during the acquisition of the images. For example, the detection, resampling, and transmission of the images takes place at the same framerate.

The control unit may be configured to correct the values indicative of the received X-rays based on a characteristic specific to a detector pixel before the resampling of the detector pixels. By doing the corrections before the resampling, the corrections can be done more precisely.

The X-ray imaging system may further comprise an X-ray source having a variable collimation. The control unit may be configured to set the region of interest of the X-ray detector to match with the current collimation. This allows to use an image processing pipeline with a specified image resolution; it allows to sensibly use the full capacity of the image processing pipeline in terms of image resolution, regardless of the collimation setting of the X-ray source and its corresponding field of view.

The control unit may be configured to detect a projection of at least one shutter based on the values indicative of the received X-rays, wherein the region of interest is set based on the detected projection of the at least one shutter. This allows to automatically follow the irradiated region and resample it to the fixed resolution.

The control unit may be configured to crop the pixels outside the region of interest. This way, the region of interest coincides with the region of the output image.

The control unit may be configured to compress the output image using a data compression technique before transmitting the output image. This way, a higher resolution output image may be transmitted over a data communication link that has a certain limited bandwidth.

According to another aspect of the invention, a method to be performed by an X-ray imaging system is provided. The method comprises
  setting a region of interest comprising at least a subset of a plurality of detector pixels of an X-ray detector panel comprising a surface with the plurality of detector pixels, wherein a number of detector pixels in the region of interest is independent of the number of output pixels;
  converting, by at least the detector pixels in the region of interest, X-rays received at the detector pixels into electric signals representative of values indicative of the received X-rays,
  mapping the region of interest onto an output image having a fixed number of output pixels;
  resampling the detector pixels within the region of interest to obtain values for the output pixels of the output image, and
  transmitting the output image via a data interface.

According to another aspect of the invention, a computer program product is provided, the computer program product comprising computer readable instructions, wherein the instructions are configured to, when executed by a processor system, cause the processor system to perform the method set forth.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings.

The drawings are diagrammatic and may not be drawn to scale. Throughout the drawings, similar items may be marked with the same reference numerals.

DETAILED DESCRIPTION OF EMBODIMENTS

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it is apparent that the exemplary embodiments can be carried out without those specifically defined matters. Also, well-known operations or structures are not described in detail, since they would obscure the description with unnecessary detail.

Figure 1:
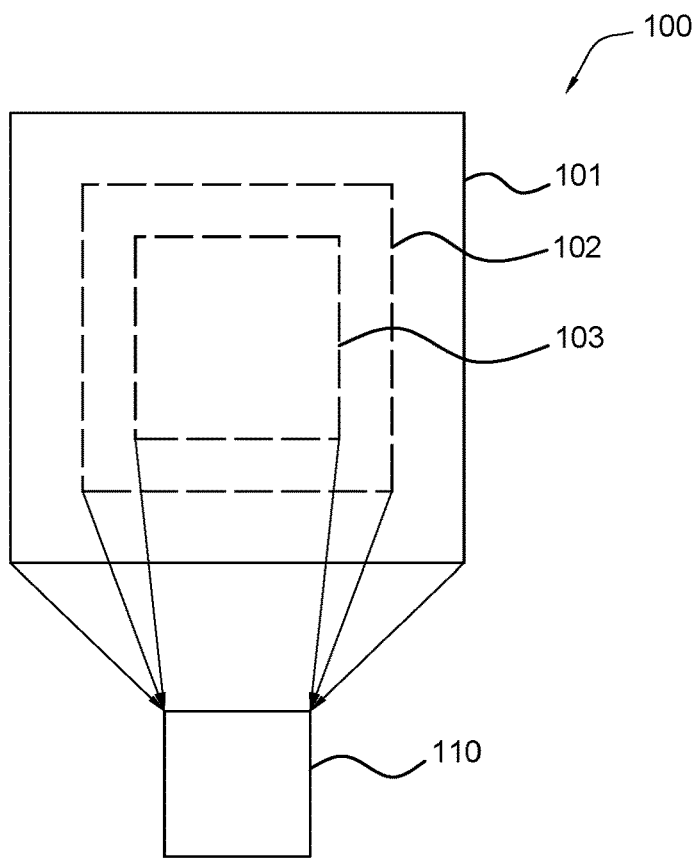
FIG. 1 illustrates the surface of a flat panel to detect X-rays.

FIG. 1 illustrates the surface of a flat panel 100 to detect X-rays. The panel 100 comprises a large number of pixels arranged in a matrix. Each pixel can detect the incoming X-rays and output an electric signal indicative of the intensity of the X-rays reaching the pixel. This is understood by the term 'physical pixel' or 'detector pixel'. The detector pixels represent values that are actually measured by an electronic sensor component. The panel 100 has, in the exemplary embodiment shown, 3080 rows and 3080 columns. This is however not a limitation. In contrast, the present disclosure is expected to work for panels with any number of pixels. In practical use, the X-ray detector may be integrated in an apparatus with an X-ray source (not illustrated). The X-ray source and the detector may be mounted on opposite ends of a C-arc, so that the system can make X-ray images of an object that is put in the center of the C-arc, in between the X-ray source and the X-ray detector. The X-ray source has a collimator, so that only the necessary part of the body is irradiated and imaged. Thus, the X-rays may only arrive at a certain portion of the panel 100. This is called a field of view (FOV) or region of interest (ROI). Of course, when processing the output of the detector, it is possible to use a different region of interest than the irradiated portion of the panel 100, although that may not provide a useful result. Examples of regions of interest are shown in FIG. 1 as well. ROI 101 covers the whole panel 100, including all 3080×3080 pixels. ROI 102 covers a region of 2053×2053 pixels, and ROI 103 covers 1368×1368 pixels. Of course, these numerical values are merely presented as examples for the ease of explanation. In practice, the number of detector pixels depends on the specification of the panel 100 and the size and shape of the ROI 101, 102. In turn, the size and shape of the ROI may correspond to the field of view imposed by the collimator. Other examples may be 1000×1000 detector pixels, 2000×2000 detector pixels, or any other number of detector pixels. Also, the number of rows of pixels does not have to be equal to the number of columns of pixels. For example, the detector or ROI could have 1000×3000 detector pixels. Moreover, in certain embodiments, the ROI can be freely chosen when using the detector, for example by means of a user interface or a control signal.

For example, a control signal may be indicative of a fraction from 0 to 1, wherein 1 indicates the whole panel surface 100 (equivalent to ROI 101), and 0 indicates size zero, i.e. no pixels at all. The detector may automatically position the ROI with the given size in the center of the panel 100, as is the case in the shown example for the ROI's 101 (corresponding to fraction 1), ROI 102 (corresponding to fraction 0.667), and ROI 103 (corresponding to fraction 0.444). Alternatively, the controls signal may indicate a number of pixels in the ROI, for example.

The output image 110 of the detector, as presented in this disclosure, is depicted in the drawing as well. The output image 110, in the presented example, has 1024×1024 pixels, regardless of the number of pixels of the ROI 101, 102, 103. The number of 1024×1024 pixels is, however, only given as an example. Other examples may be 512×512 pixels, 2000× 2000 pixels, or any other number. Also, the number of rows of pixels does not have to be equal to the number of columns of pixels. For example, the output image could be 900×2700 pixels.

Figure 2:
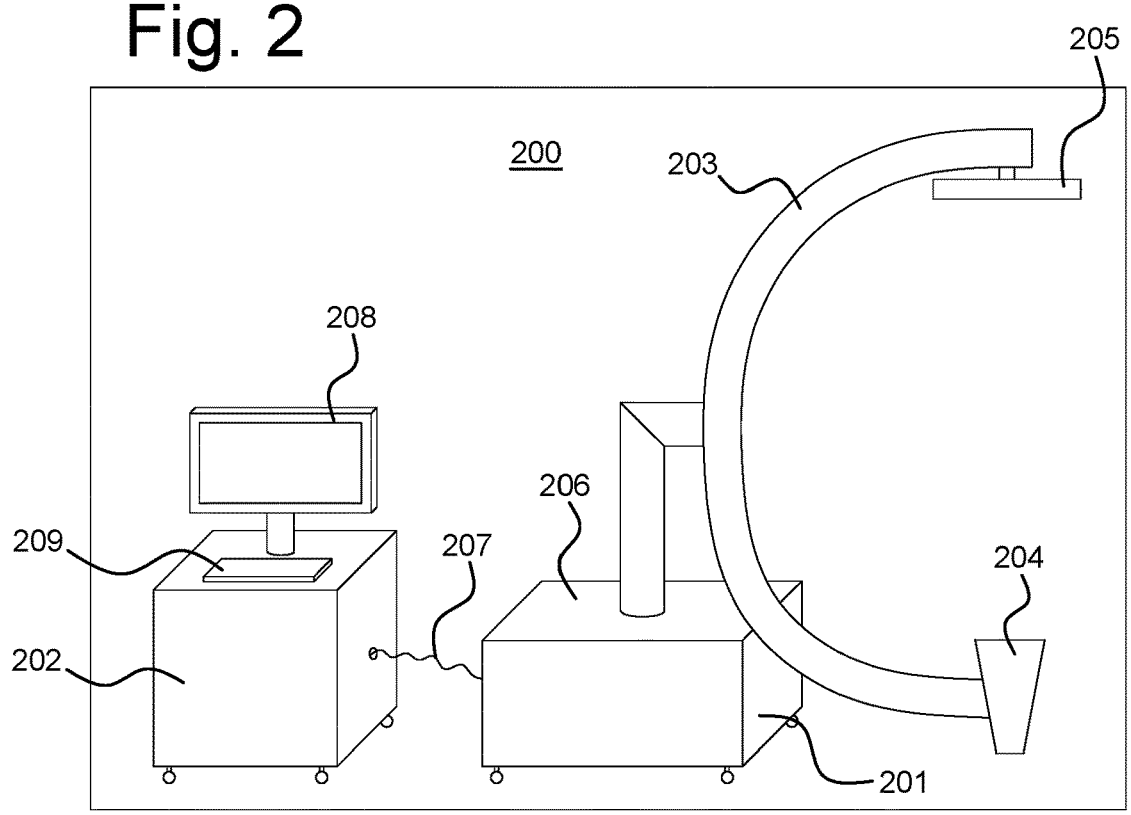
FIG. 2 shows an example of an X-ray imaging system.

FIG. 2 shows an example of an X-ray imaging system 200. The system comprises a first apparatus 201 with a C-arm 203 and a support box 206. The support box 206 may provide the support necessary to keep the C-arm in a desired position. The C-arm 203 has an X-ray source 204 and an X-ray detector 205. Further, the first apparatus 201 is connected to a second apparatus 202 via cable 207. Images generated by the detector 205 are transmitted from the first apparatus 201 to the second apparatus 202 through the cable 207. The second apparatus 202 comprises a display device (monitor) 208 and an input device, such as a keyboard 209, mouse, control buttons, etc. Both devices may be moved around on wheels. Although this is a common configuration for an X-ray system, in particular in interventional medicine, cardiac, angiography, and surgery applications, this is by no means limiting and the present disclosure can also be applied in other kinds of X-ray systems comprising of a single apparatus integrating C-arc and console, for example.

Figure 3:
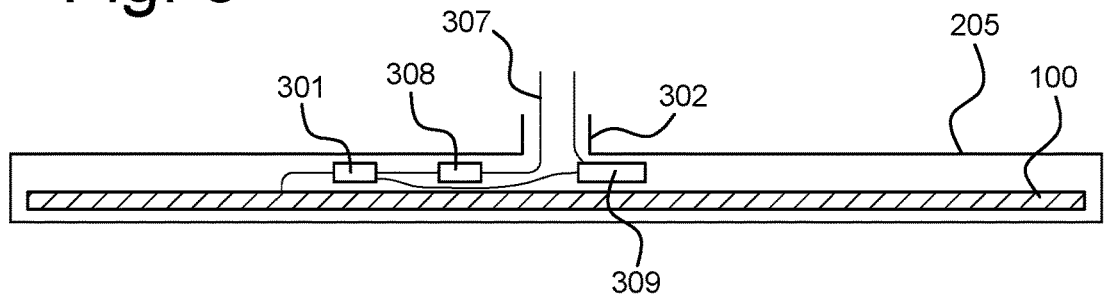
FIG. 3 shows an enlargement of a cross section of an X-ray detector.

FIG. 3 shows an enlargement of a cross section of the X-ray detector 205. The X-ray detector 205 comprises the flat panel detector 100, a control unit 301, a data interface 308, and an input unit 309. The control unit 301 may be a computer processor, for example. The X-ray detector 205 may further comprise an X-ray grid (not illustrated) in front of the flat panel detector 100, to reduce scatter. The X-ray detector 205 may be fixed onto the C-arc 203 with a connection means 302 (e.g., matching shapes on the C-arc 203 and the detector 205, matching screw holes on the C-arc 203 and the detector 205, with corresponding screws through the holes, a clicking system, etc.). The connection means 302 may allow the X-ray detector 205 to be replaced. The techniques disclosed herein may make it easier to mount different types of X-ray detectors 205 on the C-arc 203, without having to make changes to the X-ray imaging system outside the detector 205. The connection means 302 may further comprise an electrical connector for connecting the wires of the data interface 308 and/or the input unit 309 of the X-ray detector 205 to the X-ray imaging system 200. The control unit 301 is electrically connected to the flat panel detector 100. The control unit 301 may be responsible for controlling the panel 100. In alternative embodiments, separate electronics is provided in the X-ray detector 205 to control the panel 100. The control unit 301 is further connected to the data interface 308. The data interface 308 may be, for example, a data bus, such as a CAN bus, a gigabit Ethernet (GigE) interface, or a CoaXPress (CXP) interface. The detector 205 may thus be defined as the flat panel 100 with the corresponding electronics comprising at least a control unit 301 and a data interface 308 in a housing. In certain embodiments, the control unit 301 and the data interface 308 may be integrated on an integrated circuit (IC). The detector 205 may be a replaceable component of an X-ray imaging system. For example, when the detector 205 is defective, it may be replaced with a new detector. The data interface 308 may be connected to electronical components (not illustrated) of the first apparatus 201 in the support box 206, or directly to the cable 207, by means of wiring 307, for example to transmit images from the detector 205 to the second apparatus 202 or to any other device or for displaying the images. Alternatively to cable 307, a wireless connection may be used to transmit the images.

Figure 4:
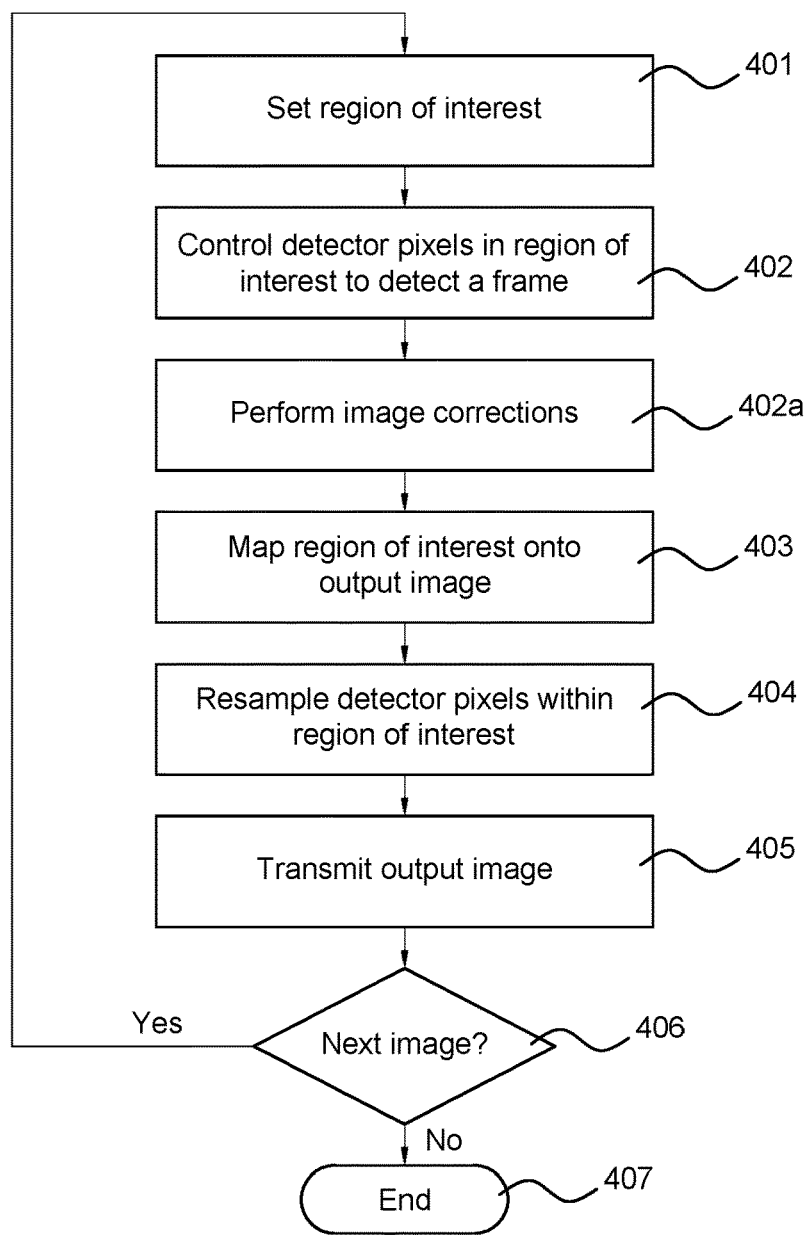
FIG. 4 illustrates a method that may be performed by an X-ray detector.

FIG. 4 illustrates a method that may be performed by the control unit 301. The method may start by setting a region of interest 401. The region of interest may be, for example, preset to be equal to the entire panel 100. Alternatively, the region of interest is set dynamically. The region of interest may be set, for example, using a numeric value indicative of the size of the region of interest. Alternatively, for example, four coordinate pairs may be used to indicate four corners of a rectangular region of interest. These coordinate pairs, or the size of the region of interest, may be received from a device external to the detector 205, e.g. via a digital or analog communication line or via the data interface 308. For example, the four corners of a rectangular region of interest may alternatively be received in form of an offset, width, and height of the region of interest, which may be expressed in pixels.

In certain embodiments, the region of interest 401 may be determined automatically, for example by detecting a region of the detector on which X-ray is received. For example, the processor may analyze a frame acquired by the detector. By analyzing the frame, one or more shutter positions may be detected. For example, four shutter positions may be detected in the frame to support a configuration of a rectangular collimated region of interest, for example. The region of interest 401 may be set to cover exactly the area in between the shutters, which is the area that contains the shadow of the irradiated material. The shutter positions may be detected by known image processing techniques, including for example edge detection and/or a Hough transform.

In step 402, the detector is controlled to acquire a frame using at least the detector pixels in the region of interest. The detector panel may be controllable to enable only the pixels in the region of interest. In other embodiments, the detector panel 100 detects the X-rays incident to all pixels and outputs all corresponding pixel values, regardless of the region of interest. In that case, the control unit 301 may receive the pixel values for all the detector pixels, regardless of the size of the current region of interest. The frame with the detector pixel values may be stored in a frame buffer (not illustrated).

In certain embodiments, step 402 is followed by a step 402a of performing image corrections, in particular hardware-dependent image corrections. For example, these corrections are aimed at correcting for defects or variabilities of the X-ray detector, based on calibration parameters, for example. For example, the image correction may correct for pixel defects, row noise, column noise, and/or flat field.

In certain embodiments, the detector 205 has a grid (not illustrated) to reduce scatter. However, this grid may cause a pattern of reduced gain or, in certain cases, moiré. The corrections performed in step 402a may comprise correction to remove artifacts caused by the scatter grid, for example antialiasing.

The corrections of step 402a are advantageously performed before the actual resampling of detector pixels in step 404, because the original pixel values can be corrected based on the individual characteristics of each detector pixel and/or the known effect of the grid on each individual detector pixel.

In step 403, the region of interest is mapped onto an output image. The output image may have a fixed number of output pixels that is chosen beforehand, independently from the number of detector pixels or the current region of interest. The size of the output image in terms of number of pixels and/or bits per pixel may be a configurable parameter that may be set by a service engineer when mounting the detector 205 on a particular C-arm 203. The setting of the size of the output image may depend on the specifications and/or capabilities of the X-ray imaging system 200. Alternatively, the size of the output image may be fixed, for example programmed in firmware, during the manufacturing process of the detector 205, based in part on the specifications of the data interface 308 or the expected capabilities of supported X-ray imaging systems.

The mapping means that each pixel of the output image is associated with one or more detector pixels in the region of interest. For example, the top left corner of the output image is associated with the top left corner of the region of interest, the top right corner of the output image is associated with the top right corner of the region of interest, the bottom left corner of the output image is associated with the bottom left corner of the region of interest, and the bottom right corner of the output image is associated with the bottom right corner of the region of interest. The remaining output pixels may be associated to the remaining detector pixels in the region of interest.

Next, in step 404, the detector pixels in the region of interest are resampled. If there are any detector pixels outside the region of interest, they may be cropped, i.e. discarded. The value of each output pixel is determined by combining the associated one or more detector pixels. This may be done using any interpolation technique. Such an interpolation technique is known in the art per se. For example, a bi-cubic interpolation filter may be implemented. Other resampling techniques are disclosed elsewhere in this disclosure. This way, the value of each output pixel of the output image may be determined. After having been determined, the output pixel values may be transmitted via the data interface 308. After that, in step 406, it is determined whether the process should be repeated for the next image, for example in case of dynamic imaging, such as fluoroscopy. In such a case, the process restarts from step 401. If there is no next image, the process ends in step 407.

In certain embodiments, the detector 205 may comprise an input unit 309. Although the input unit 309 is indicated as a separate electronic component in FIG. 3, it will be understood that it may alternatively be integrated with the control unit 301, optionally together with the data interface 308, on an integrated circuit (IC). In an alternative embodiment, the input unit 309 is combined with the data interface 308. For example, in certain embodiments, the input signal may be received through the data interface 308 and may be forwarded to the control unit 301 by the data interface 308. The input unit 309 may be configured to receive a signal indicative of the region of interest. Herein, the size of the region of interest may be substantially continuously variable. Alternatively, a number of preset regions of interest may be programmed inside the control unit 301, and the signal may be indicative of one of the preset regions of interest.

In certain implementations, the size of the output image is fixed by design. For example, the size of the output image is fixed in software that is stored in a firmware or a read-only memory. Certain other embodiments may allow configuration of the size of the output image more freely.

For example, the detector 205 can be configured to support two modes, original resolution and adaptive resolution, wherein adaptive resolution means rescaling the images to the predetermined size, regardless of the actual size of the original detected image. For example, the detector 205 can comprise a microswitch. When the detector 205 is incorporated in an imaging system that cannot handle the images of the original size, the service engineer or manufacturer sets the microswitch on the detector to enable adaptive resolution. Otherwise, the service engineer or manufacturer sets the microswitch to disable adaptive resolution. In certain embodiments this configuration may be done in software or may be switched on and off on the fly according to the specific use of the imaging system (e.g., use adaptive resolution only during dynamic imaging but not during static imaging).

The region of interest (the whole detector area or a subset thereof), and the corresponding number of detector pixels in the region of interest, is independent of the number of output pixels. That is, the detector 205 is not limited to e.g. binning of pixels. Instead, the detector 205 can map whatever number of detector pixels to the predetermined number of output pixels and use a resampling technique to compute the appropriate output pixel values.

For example, the size of the output image matches a processing capability of a host system, for example processing electronics in the support box 206 of the first apparatus 201 or a visualization/image storage system comprised in the second apparatus 202. The number of detector pixels in the region of interest, on the other hand, is determined by the arrangement of detector pixels on the surface of the detector panel 100.

The output image may have a number of output pixels in a first direction and a number of output pixels in a second direction, and any multiple of the number of output pixels in the first direction can be different from the number of detector pixels in the first direction in the region of interest. Moreover, any multiple of the number of output pixels in the second direction can be different from the number of detector pixels in the region of interest in the second direction. Interpolation is performed by the control unit 301 to convert the detector pixels into output pixels.

The X-ray detector may be configured to detect a series of X-ray images, for example in a fluoroscopy mode. The control unit is configured to resample the pixels of each detected X-ray image within the region of interest in real time and the transceiver is configured to transmit the output images corresponding to the detected X-ray images in real time. That is, the control unit 301 resamples the images at a speed sufficient to maintain the frame rate of the detector panel 100.

The X-ray imaging system 200 may further comprise an X-ray source 204. The X-ray source, or X-ray generator, may have several controllable parameters, such as exposure time, intensity, and collimation. The collimation determines the field of view and the relevant area on the detector 205. Therefore, there can be a connection from the collimator of the X-ray source 204 to the X-ray detector 205 to communicate the collimator setting to the X-ray detector 205.

Alternatively, a control system is provided in the host system, in support box 206 or in the second apparatus 202, the control system can transmit the collimation settings to both the X-ray source 204 and the X-ray detector 205. The X-ray detector 205 receives the collimation setting via the input unit 309 and the control unit 301 sets the region of interest according to the collimation setting.

In certain applications, the X-ray imaging system comprises a C-arm apparatus and a separate console apparatus, the C-arm apparatus and the console apparatus being configured to be connected to each other by means of a disconnectable connection, which may be a wired connection or a wireless connection, wherein the X-ray imaging system is configured to transmit the output image from the C-arm apparatus to the console apparatus via the connection. This way, the connection between the two subsystems of the imaging system does not depend on the specifications of the X-ray detector, which may be part of the C-arm apparatus. Also the design of the console apparatus does not depend on the specifications of the X-ray detector. For example, a cable connection between the X-arm system and the console system may be particularly expensive to change.

FIG. 2 shows an X-ray imaging system 200 that comprises a C-arm apparatus 201 comprising the C-arm 203 and a support box 206, which may have wheels for easy positioning to form a first trolley. The X-ray imaging system 200 may further comprise a separate console apparatus 202, with a user interface 209 (keyboard, mouse, or touch screen, etc.) and a display 208 for displaying the output images. The console apparatus 202 may comprise the image processing electronics to provide visualization and/or storage functionality of the output images. The C-arm apparatus 201 and the console apparatus 202 may be connected to each other by means of a cable 207, which may be have connector ports to connect and disconnect the C-arm apparatus 201 and the console apparatus 202 to and from each other using the cable 207. The C-arm apparatus 201 is configured to transmit the output image to the console apparatus 202. Thanks to the fixed size of the output images, the connection 207 can be designed before the detector panel 100 was developed, even before the number of detector pixels of the detector panel 100 is known. An alternative implementation can use a wireless connection between the C-arm apparatus 201 and the console apparatus 202. In yet an alternative implementation, the components of the C-arm apparatus 201 and the console apparatus 202 can be integrated in a single apparatus.

Figure 5:
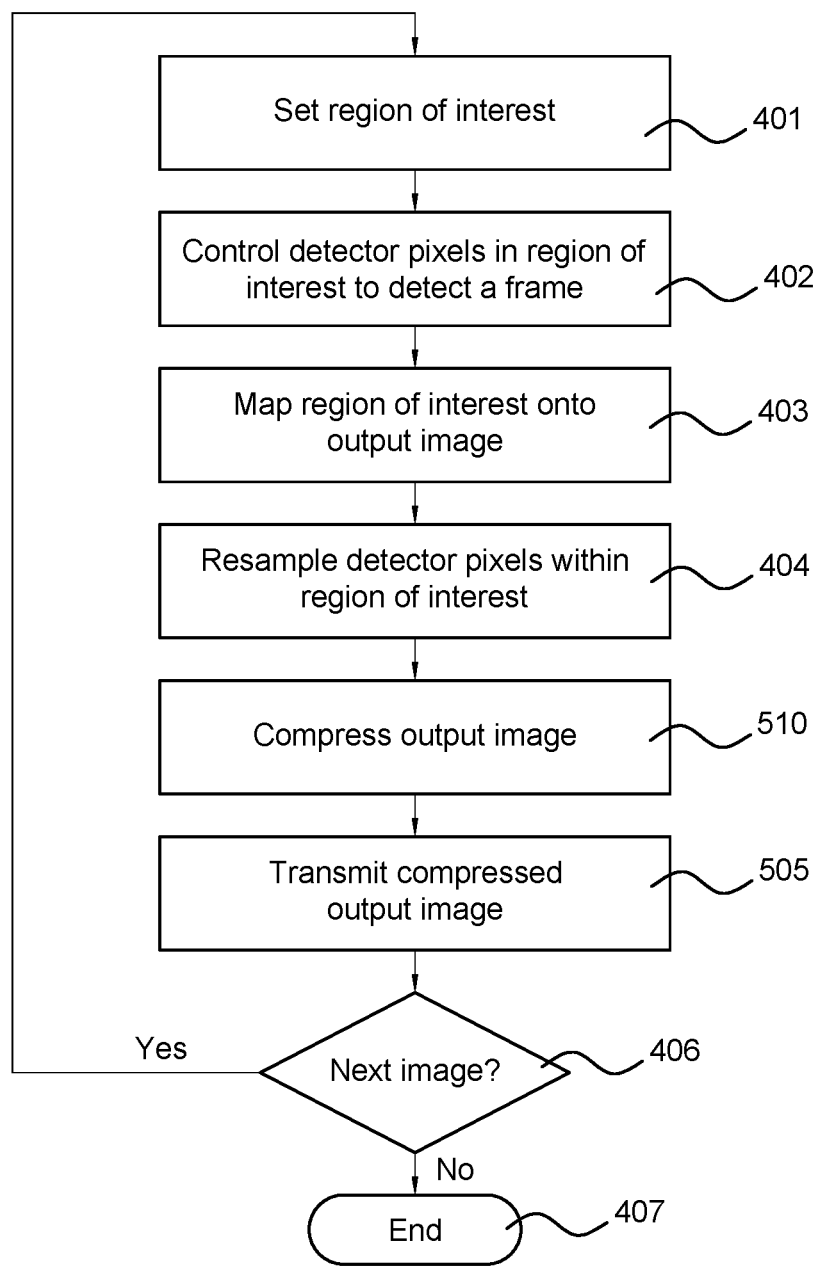
FIG. 5 illustrates another example of a method to be performed by an X-ray detector.

FIG. 5 illustrates another example of a method to be performed by an X-ray detector. In FIG. 5, steps 401 to 404 and 406-407 are similar to the example shown in FIG. 4. For reasons of conciseness, the details of those steps are not reiterated here. In the example of FIG. 5, after the output image has been determined, using the resampling of the detector image as in step 404, a step 510 follows in which the output image is compressed. For example, a lossless image compression technique may be used in order to preserve the image quality entirely. Alternatively, a lossy image compression technique may be used. Lossless image compression may be achieved, for example, using run-length encoding or Huffman coding. Lossy compression may be performed using, for example, transform coding, such as a discrete cosine transform or wavelet transform. These and other compression techniques are known, by themselves, to the person skilled in the art of compression techniques. The compression may be a further enabler to use a legacy interface, with a limited bandwidth, to handle the amount of data generated by the detector 205. In some cases, this may enable the use of output images with more pixels. For example, the data rate may be limited by the connection interface between the C-arm apparatus 201 and the console apparatus 202. In such a case, the console apparatus 202 may be provided with decompression functionality to decompress the received output images before further processing and visualization of the output images.

It will be understood that the method, disclosed in relation to FIG. 4 and FIG. 5, may be implemented in software. The software may comprise computer readable instructions, which may be stored on a non-tangible computer readable media. The instructions may cause the control unit 301, when it executes the instructions, to perform at least one of the methods set forth herein.

For example, a method performed by an X-ray detector may comprise step 401 of setting a region of interest comprising at least a subset of a plurality of detector pixels of an X-ray detector panel comprising a surface with the plurality of detector pixels, wherein the detector pixels are configured to convert received X-rays into electric signals representative of values indicative of an intensity of the received X-rays. The method may further comprise step 403 of mapping the region of interest onto an output image having a fixed number of output pixels. For example, the output image has a predetermined number of output pixels in a first direction and a predetermined number of output pixels in a second direction. The method further comprises step 404 of resampling the detector pixels within the region of interest to obtain values for the output pixels of the output image. In step, 405, the X-ray detector transmits the output image via a data interface. If necessary, as determined in step 406, the process is repeated. Otherwise, the process may end. Further, the process may comprise the step 402 of controlling at least the detector pixels in the region of interest to detect a frame before resampling the detector pixels in step 404. However, this control function may also be implemented in another component.

It will be understood that in principle, the steps may be performed in a different order. For example, steps of controlling the detector pixels may be performed before or after any of setting the region of interest and mapping the region of interest.

Figure 6:
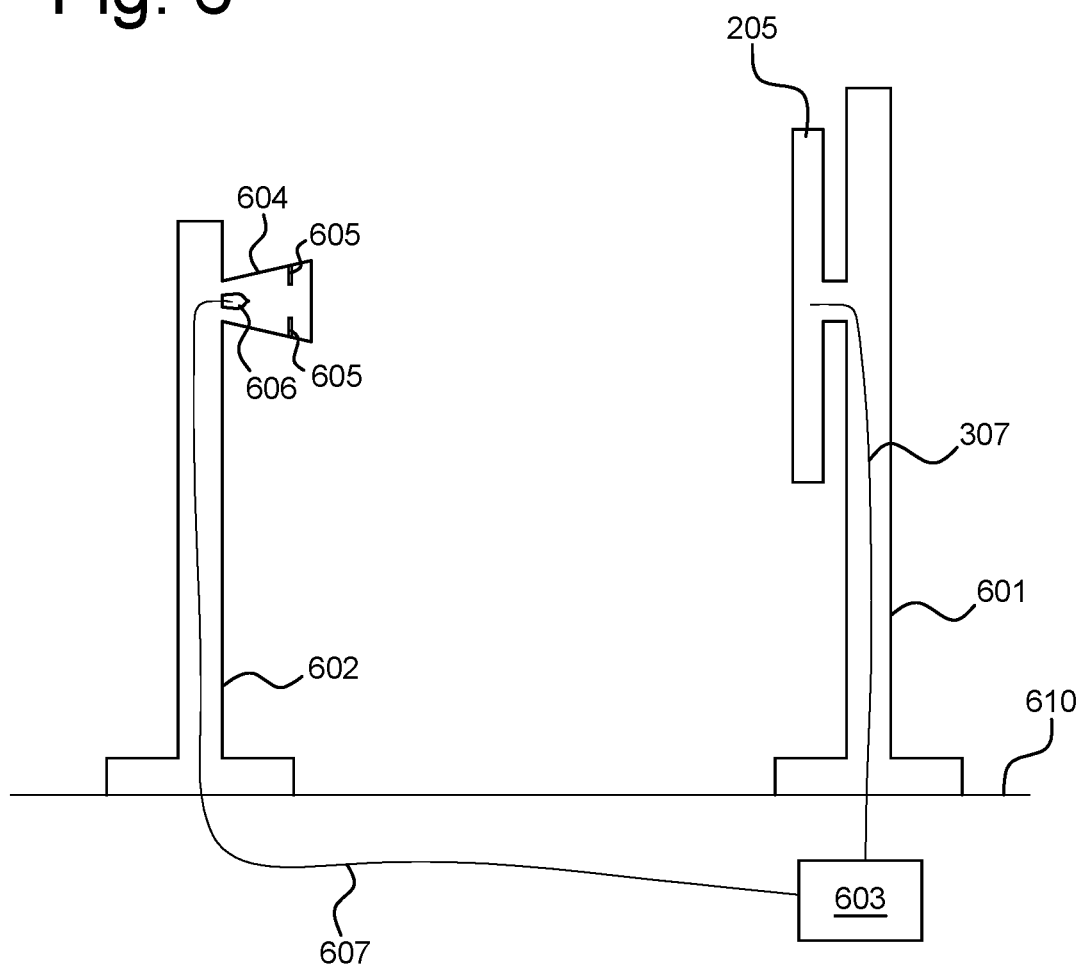
FIG. 6 shows another example of an X-ray imaging system.

FIG. 6 illustrates another example of an X-ray system in which the detector 205 may be used. The X-ray system shown in FIG. 6 may be optimized for Thorax imaging, for example, or for any other kinds of X-ray imaging. The X-ray detector 205 of FIG. 6 is similar to the X-ray detector 205 shown in FIGS. 2 and 3. Therefore, a detailed description is omitted here. The X-ray system further comprises a support 601 for the X-ray detector. The support 601 can rest on the ground floor 610. In alternative embodiments, the support may be fixed to a wall, for example. The detector 205 can be fixed to the support 601 at a desired height, for example. The imaging system further comprises a support 602 with an X-ray source 604 (or X-ray generator) mounted thereon. The support 602 can also rest on the ground floor 610, or be mounted to a wall, opposite the support 601, for example. The support 601 and the support 602 can be positioned so that the X-ray source 604 sends its radiation in the direction of the detection surface of the X-ray detector 205. A subject (e.g. a patient) can stand in between the X-ray source 604 and the X-ray detector 205. The X-ray source can comprise an X-ray tube 606 and shutters 605. For clarity, two shutters 605 have been drawn. However, the X-ray source 604 can have a different number of shutters, for example four shutters to define a rectangular imaging area. The detector 205 can have a processor programmed to detect the projections of the shutters to set the region of interest corresponding to an irradiated area of the detector 205, for example.

The X-ray detector 205 and the X-ray source 604 may be connected to a control unit 603 by means of wires 307 and 607, respectively. The wire 607 may be used to control the X-ray tube 606 and the position of shutters 605, for example. Further, the wire 307 may be used to transmit images having a fixed resolution from the X-ray source 205 to the control unit 603. Further, the wire 307 may be used to control the X-ray detector 205, for example by transmitting a signal indicative of the region of interest from the control unit 603 to the input unit 309 of the X-ray detector 205. In certain alternative embodiments, such a signal indicative of the region of interest may be transmitted directly from the X-ray source 604 to the X-ray detector 205, based on the positions of the shutters of the X-ray source 604. The control unit 603 has been located underground in FIG. 6. However, the control unit 603 can be disposed in any suitable location.

Moreover, the application is by no means limited to the exemplary X-ray systems shown in FIGS. 2 and 6 for purpose of illustration. The X-ray detector set forth herein can be advantageously used in any type of X-ray system. Other examples of X-ray systems in which the detector may be advantageously used include, but are not limited to, fixed systems, mobile systems, surgery systems, fixed and mobile C-arm systems, cardiovascular systems, thorax systems, universal radiography systems, cone-beam CT systems, and digital tomosynthesis systems. Moreover, the detector with 'adaptive resolution' may be configured to operate in continuous mode, fluoroscopy mode, static picture mode, and/or exposure mode.

It may be advantageous that a medical x-ray system is equipped with a real-time zooming capability that effectively increases or decreases the resolving power when zooming-in or zooming-out.

Many medical x-ray systems are equipped with a defined, mostly 1 k2 pixel, imaging pipeline that is not suitable to handle higher resolution images.

For these reasons, the present disclosure proposes a zooming technique that comprises varying the effective image format at the input of the detector while keeping constant image format at the output of the detector.

Prior art FXD's have either no real-time zoom capability or a limited real-time zoom capability. The latter consists of using different image formats with different numbers of pixels for different zoom positions or binning pixels.

Besides the spatial domain, prior art imaging systems have a similar limitation in the temporal domain. As a result of the defined pixel throughput of the host system, the maximum image frame speed is limited, e.g. to 30 fps.

The present invention provides pixel remapping or image compression at detector level to overcome these limitations. Image compression may be lossless or lossy.

When equipping prior art imaging systems with a new type of detector, which may have better performance, the input format, image format and pixel rate, or a combination thereof, is likely to change. As a consequence, system integration, especially integration into legacy systems, requires a corresponding change of the input format, imaging pipeline and pixel throughput or a combination thereof. With prior art imagers the selection of a Region Of Interest is either not possible or very limited.

The whole imaging system can be designed and optimized to process images having a certain predetermined image resolution. Using the techniques disclosed herein, when a detector is replaced with another detector that has a different number of detector pixels, the image processing pipeline, including any hardware interfaces, does not have to be reengineered, which leads to significant cost savings and increased flexibility. The detail of the output image is determined in part by the predetermined number of pixels. Therefore, if the number of detector pixels in the region of interest is larger than the number of output pixels in the output image, the information of several detector pixels may be combined in a single output pixel during the resampling procedure, which improves the sensitivity. If the number of detector pixels in the region of interest is smaller than the number of output pixels in the output image, it is possible to zoom out by setting a larger region of interest, without any loss of accuracy of the output pixels. This way, no X-ray dose is lost and no changes are necessary to the imaging pipeline, which can continue to process a fixed number of pixels per image, as usual. Thus, it becomes more cost efficient to deploy flat panel detectors in low-cost X-ray equipment.

Medical X-ray systems for high dose exposure (e.g. spot imaging) and fluoroscopy for universal radiography and, amongst others, cardiovascular applications nowadays entering the market are more and more equipped with a Flat X-ray Detector (FXD's) instead of an Image Intensifier with TeleVision camera (IITV). IITV's contain imaging tubes, whereas FXD's contain solid state image devices with discrete pixels suitable for dynamic or static imaging. Both FXD's and IITV's have their advantages and disadvantages, but FXD's have, compared to IITV's, the great advantage of being flat and, because of having discrete pixels, being free from distortion, which opens the possibility of new applications. Nevertheless there also is still a large number of installed base equipped with IITV's. The present disclosure can be used, for example, in medical X-ray imaging in combination with a Flat X-ray Detector (FXD), for example when replacing an IITV by an FXD.

Many medical X-ray imaging systems have an imaging pipeline that can handle image formats of up to 1 k2 pixel resolution (i.e., 1024×1024 pixels). With 'adaptive resolution', any Region of Interest (ROI) on the detector can be scaled to an image fitting within the 1 k2 pipeline. 'Adaptive resolution' enables existing pipelines to handle any image size from the detector, which makes it very easy at system level to deal with X-ray image collimation and projection alignment. Selecting a ROI can even be made automatic on system level based on image content while keeping 1 k2 image resolution at all times. The latter provides a great increase in usability for the end user.

For many manufacturers of X-ray systems, this will mean no need for new expensive platform development of their X-ray imaging system to switch from IITV to FXD, including no need for expensive cable modifications. And as the hardware remains identical, this will result also in less complex certification (such as FDA510(k)). Additionally, with 'adaptive resolution' it may be possible to create zoom functionality with FXD similar to IITV. Moreover, 'adaptive resolution' makes it easier to switch from one type of FXD to another type of FXD. Even if the number of pixels on the new type of FXD is different from the old detector, the output image of the new FXD can be adapted to have the same resolution as the old FXD. Thus, it is easier to integrate a new type of FXD into an existing X-ray system.

A medical X-ray imaging systems may by equipped with an interface, such as gigabit Ethernet (GigE), with a bandwidth that limits the throughput of the overall imaging pipeline. For example, a stream of images with 1 $k^2$ (or 1024×1024) pixel dimension and a frame rate of 30 frames per second (FPS) fits nicely on GigE interfaces, common in many X-ray systems today, especially mobile C-arms.

This limited bandwidth may not support operating the detector at full resolution and speed. Lossless or lossy compression may allow reducing the necessary bandwidth on the interface, especially when combined with 'adaptive resolution' to scale back from high resolution to a lower resolution, such as 1 $k^2$. The lower bandwidth at the interface also allows to bridge longer long distances (with cabling).

Frequently, new types of detectors are introduced on the market, with better performance, e.g. lower read noise, and/or pixel throughput. For example, recently IGZO FXD panels were introduced. In many cases these detectors have will have a different input and (digital) image format for reasons of pixel size and number of pixels. For example, image format generated by IGZO FXD panels differs from traditional IITV systems. Other FXD panels that are developed may have further differing numbers of pixels and image formats. The difference in input and image format makes it difficult or even impossible to introduce these new detectors in legacy systems. Introducing these new detectors would involve an upgrade or even a complete redesign of the host system, including the interface, to handle the changed image format and/or the pixel throughput (bandwidth). As changes to legacy systems are most of the time very costly this prevents upgrading to newly introduced detectors.

The techniques disclosed herein, in particular 'adaptive resolution' technology, concerns real-time interpolation algorithms in the detector to transform physical sensor pixels into virtual pixels of the desired size and cropping by removing any values of unnecessary pixels. This allows mapping in real time an arbitrary detector format (pixel matrix) on every arbitrary digital image format (pipeline matrix). The pixel size is in effect user selectable. Moreover, the pixel size may be continuously variable, i.e. selectable in stepless fashion. Adaptive resolution may be combined with (lossless) image compression to allow higher pixel throughput (limiting the bandwidth) through legacy interfaces.

As adaptive resolution allows selecting the pixel size to create an arbitrary input format keeping the digital output image format constant, it will become possible to incorporate a different type of detector having a different input format into a legacy system, and to transform that input format to match the image format of the legacy system to allow using the existing imaging pipeline of the legacy system.

The present techniques also allow to support continuous 'zoom' on FXD's, as was possible with image tubes, while keeping the image format constant. This way, capabilities of IITV's may be recreated on FXD's. As this 'zooming' is mostly used to go from the native input format of the detector to a smaller input format and vice versa, the pixel density increases when zooming-in, as is the case when zooming in with optic zoom of the camera of an IITV.

It is noted that all the above transformations may be performed in real-time even while acquiring a series of images, for example in a fluoroscopy mode.

The performance, e.g. the ratio of resolution versus dynamic range, of the virtual pixels may equal that of the physical pixels on the detector. In other words, although the virtual pixels may be larger than the actual detector pixels, in exchange the dynamic range is improved, because in that case the measurements of multiple detector pixels can contribute to the value of each virtual pixel. Pixel density of the virtual pixels and the size of the region of interest can be exchanged against each other thanks to the constant format at the output interface.

When combining the present adaptive resolution with a data compression technique, which may be lossy or lossless image compression, such as MPEG, H.264, or variable-length coding such as Huffman coding, even more freedom is obtained. In that case, images with more pixels can be transmitted through a communications link with a limited bandwidth. Adaptive resolution also allows zoom capability.

In this disclosure, the term 'virtual pixel' is used to denote an area on a detector that corresponds to a certain pixel of the output image. This area on the detector may cover at least part of one or more physical pixels of the detector. The intensities measured by those one or more physical pixels may be combined using an interpolation or resampling technique, such as nearest neighbor or cubic spline interpolation, to obtain the value of the 'virtual pixel'. Those virtual pixels are the output pixels of the output image of the disclosed detector.

The 'adaptive resolution' technique disclosed herein may comprise continuous rescaling, using 2D re-sampling, of an image output by a detector to a new desired image output format. Or in other words, physical pixels are digitally converted into virtual pixels of a different size. Image scaling involves a 2D re-sampling of the intrinsic sensor image. The general approach may be to implement the re-sampling process as a cascade of two successive 1D scale operations (first vertical and then horizontal or vice versa). A 1D re-sampling operation can be performed by means of a poly-phase filter. The performance in terms of modulation transfer function (MTF), noise, and Moiré are determined in part by the choice of the poly-phase filter response. Poly-phase filter response selection can be a compromise between how much ringing can be tolerated around sharp edges, and how steep does the filter roll-off in the (spatial) frequency domain, preserving base band frequencies but suppressing out-of-band frequencies that may cause Moiré. An example filter is a bi-linear filter. Although that filter may have relatively poor quality, it has a very low implementation complexity. A more suitable filter may be a bi-cubic interpolation filter with a selected sharpness. Another suitable filter may comprise a Lanczos filter. A Lanczos filter comprises a sinc filter windowed by a second sinc function of the width of the filter.

Application of 'adaptive resolution' may comprise cropping and scaling an image so that any arbitrary output format can be obtained from any arbitrary input format minimizing possible negative impact on the image quality. Application of 'adaptive resolution' may allow to exchange detectors with different formats in the application while retaining the imaging and output formats. Application of 'adaptive resolution' in combination with Flat X-ray Detector may allow to implement continuous zoom functionality, retaining the constant output format, and thus increasing the effective image resolution in terms of pixels per centimeter when zooming in. Application of 'adaptive resolution' may allow to use Flat X-Ray Detectors that may have a relatively large image format in terms of numbers of pixels in a detected image in combination with legacy systems having a limited processing pipeline. Application of 'adaptive resolution' may allow to manually or automatically adapt the effective detector format to assist collimation and projection alignment. Application of 'adaptive resolution' or 'adaptive resolution' in combination with lossless (or optionally lossy) compression may allow to re-use legacy interfaces with limited bandwidth.

The techniques disclosed herein may help to provide real-time clinical zoom functionality on detector level, similar to IITV. Image Intensifiers support real-time zoom on detector level, allowing clinical users to 'zoom in' onto details in an X-ray image during live X-ray acquisition and display. From an overview image on the largest II format, users can zoom in to look at details with in a region of interest. II supports an optical zoom, meaning that effectively the resolving resolution of details (the pixel density) in the zoom field of view (FOV) or ROI increases as the II zooms in further, and the FOV or ROI becomes smaller. Typically II's may support predefined zoom formats (II modes). These may have the shapes of centered circles with various diameters. Existing flat detectors only support ROI on detector level. But this causes a loss of resolving resolution in the object. With ROI one can 'blow up' a smaller pixel format to fit on the same monitor, giving a zoom impression, but with loss of resolution. On system level a zoom that preserves the resolution is possible in combination with a high resolution detector signal. This can be done on system level when the host is able to perform a real-time remap based on a high resolution image form the detector. Clinically this digital zoom does not provide differences to the user whether it is performed in the detector or on the system level (outside detector). Pre-condition on system level is that one needs (1) a detector with high resolution and data rate performance, and (2) a pipeline capable of real-time handling of high resolution high speed image sequences. These architectures are, however, not common in mobile C-arms. 'Adaptive resolution' in FXD enables best in class continuous zoom without requiring modifications to image processing on the host.

There is a trend in flat panel X-ray detectors towards using smaller detection pixels, leading to a higher resolution and a larger number of detector pixels on the detector surface. At a system level, it would normally require increasing the bandwidth of the image pipeline in order to support a higher resolution detector. Using the techniques disclosed herein, it is not necessary to adapt the image pipeline of an X-ray system when replacing the detector with another detector having a different (higher) resolution.

Preferably, the image conversion of a series of images is performed in real-time (e.g. within 1 frame delay), hence making the fit to the real-time image pipeline very easy for the equipment manufacturer. For example, existing image processing pipelines from IITV C-arms can be re-used. No expensive cable modifications are necessary any more to switch from IITV to flat detector.

Many mobile C-arm systems have two trolleys (one trolley with the C-arm itself and a processing/monitor/workstation car). The cable between both trolleys is often complex and expensive to modify. With 'adaptive resolution', one can connect any resolution detector through the existing cable to the host. This saves significant costs at the equipment builder. Fit to existing cable infrastructure also allows field upgrades. 'Adaptive resolution' is an enabler to carry out field upgrades from IITV to FXD. Moreover, certification such as FDA510(k) is less complex, because the system hardware can remain identical.

Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

The invention claimed is:

1. An X-ray imaging system comprising an X-ray detector, the X-ray detector comprising
a detector panel comprising a surface with a plurality of detector pixels, wherein the detector pixels are configured to convert received X-rays into electric signals representative of values indicative of the received X-rays;
a data interface configured to transmit images having a fixed number of output pixels; and
a control unit configured to control to:
set a region of interest comprising at least a subset of the plurality of detector pixels, wherein a number of detector pixels in the region of interest is independent of the number of output pixels, wherein the output image has a number of output pixels in a first direction and a number of output pixels in a second direction and wherein any multiple of the number of output pixels in the first direction is different from the number of detector pixels in the first direction in the region of interest or any multiple of the number of output pixels in the second direction is different from the number of detector pixels in the region of interest in the second direction,
map the region of interest onto an output image having the fixed number of output pixels,
resample the detector pixels within the region of interest to obtain values for the output pixels of the output image, and
transmit the output image via the data interface.

2. The X-ray imaging system of claim 1, wherein the X-ray detector further comprises
an input unit configured to receive a signal indicative of the region of interest, wherein a size of the region of interest is substantially continuously variable.

3. The X-ray imaging system of claim 1, wherein a size of the output image is fixed by design.

4. The X-ray imaging system of claim 1, wherein the number of pixels in the output image matches a processing capability of a host system for the X-ray detector.

5. The X-ray imaging system of claim 1, wherein the X-ray detector further comprises a connection means for physically mounting the X-ray detector on an apparatus having a corresponding connection means, wherein the data interface is configured to transmit the output images to the apparatus.

6. The X-ray imaging system of claim 5, wherein the data interface is configured to transmit the output images to the apparatus through the connection means.

7. The X-ray imaging system of claim 1, wherein the X-ray detector is configured to detect a series of X-ray images having a framerate, and the control unit is configured to resample the pixels within the region of interest in real time at the same framerate and the data interface is configured to transmit the output images corresponding to the detected X-ray images in real time at the same framerate.

8. The X-ray imaging system of claim 1, wherein the control unit is configured to correct the values indicative of the received X-rays based on a characteristic specific to a detector pixel before the resampling of the detector pixels.

9. The X-ray imaging system of claim 1, further comprising an X-ray source having a variable collimation, and wherein the control unit is configured to set the region of interest of the X-ray detector to match the current collimation.

10. The X-ray imaging system of claim 1, wherein the control unit is configured to:
detect a projection of at least one shutter based on the values indicative of the received X-rays,
wherein the region of interest is set based on the detected projection of the at least one shutter.

11. The X-ray imaging system of claim 1, wherein the control unit is configured to crop the pixels outside the region of interest.

12. The X-ray imaging system of claim 1, wherein the control unit is configured to compress the output image using a data compression technique before transmitting the output image.

13. A method performed by an X-ray detector, the method comprising
setting a region of interest comprising at least a subset of a plurality of detector pixels of an X-ray detector panel comprising a surface with the plurality of detector pixels;
converting, by at least the detector pixels in the region of interest, X-rays received at the detector pixels into electric signals representative of values indicative of the received X-rays;
mapping the region of interest onto an output image having a fixed number of output pixels, wherein a number of detector pixels in the region of interest is independent of the number of output pixels, wherein the output image has a number of output pixels in a first direction and a number of output pixels in a second direction and wherein any multiple of the number of output pixels in the first direction is different from the number of detector pixels in the first direction in the region of interest or any multiple of the number of output pixels in the second direction is different from the number of detector pixels in the region of interest in the second direction;
resampling the detector pixels within the region of interest to obtain values for the output pixels of the output image; and
transmitting the output image via a data interface.

14. A computer program product comprising computer readable instructions, wherein the instructions are configured to, when executed by a processor system, cause the processor system to:
set a region of interest comprising at least a subset of a plurality of detector pixels of an X-ray detector panel comprising a surface with the plurality of detector pixels;
control at least the detector pixels in the region of interest to convert X-rays received at the detector pixels into electric signals representative of values indicative of the received X-rays;
map the region of interest onto an output image having a fixed number of output pixels, wherein a number of detector pixels in the region of interest is independent of the number of output pixels, wherein the output image has a number of output pixels in a first direction and a number of output pixels in a second direction and wherein any multiple of the number of output pixels in the first direction is different from the number of detector pixels in the first direction in the region of interest or any multiple of the number of output pixels in the second direction is different from the number of detector pixels in the region of interest in the second direction;
resample the detector pixels within the region of interest to obtain values for the output pixels of the output image; and
transmit the output image via a data interface.

* * * * *